Patented Mar. 2, 1943

2,312,449

UNITED STATES PATENT OFFICE 2,312,449

CATIONIC EXCHANGE MATERIAL

Milton J. Shoemaker, Madison, Wis., assignor to Research Products Corporation, Madison, Wis., a corporation of Wisconsin No Drawing. Application October 13, 1938,
Serial No. 234,789

10 Claims. (Cl. 252—179)

This invention relates to carbonaceous cationic exchange materials and to a method of preparing an improved material of such character which has high exchange capacity and other valuable properties. It is known that certain carbonaceous materials, particularly low grade coals and other fossil carbonaceous materials, after being subjected to chemical treatment, are capable of undergoing a cationic exchange reaction, and various methods have been proposed for preparing from such substances cationic exchange products which are adapted for treating water to remove cations therefrom. These carbonaceous exchange products possess advantages over the alumino-silicate zeolites in that they are more resistant to hot water and waters which have low pH value and low silica content and may be regenerated by means of an acid as well as by means of salt.

It is the object of this invention to obtain from such carbonaceous substances improved cationic exchange materials having high exchange capacity, low density, a high degree of toughness and resistance to attrition losses, and high resistance to the imparting of color to water. The product also possesses the property of removing soluble iron and manganese compounds from water.

Various carbonaceous substances may be used as sources from which to prepare the cationic exchange product of this invention, such as peat, lignite, sub-bituminous coal and substances of similar constitution. Cellulosic or carbohydrate material, which has been subjected to carbonization under such conditions whereby it retains an appreciable amount of combined hydrogen, may also be used. Examples are wood, wood pulp, sawdust, grain hulls and the like. Such material may be heated in the absence of air to a temperature between 150 and 300° C. with or without the application of steam, whereby it is carbonized with the retention of a substantial quantity of hydrogen. Such carbonized product is a suitable source of raw material for this invention. Lignite, however, and particularly that which is obtained from the lignite beds of North Dakota and Saskatchewan, Canada, is the most satisfactory source and the preferred raw material. Variations sometimes occur in the lignite from these beds and it has been found that that which possesses a glossy fracture is superior. Where the term "carbonaceous material" is used in the specification and claims materials of the character described are contemplated.

Cationic exchange materials have been made from lignite in the past by treating it with a solution of sodium chloride, and also by treating it with a solution of sulphuric acid, concentrated and dilute solutions having been used in different processes. In accordance with the present invention, it has been discovered that a high exchange capacity may be obtained if the lignite is subjected first ot a treatment with an alkali solution and then with an acid solution.

The lignite is first reduced to granules of the desired size and is then treated with the alkali solution. This treatment may be carried out at any desired temperature. It has been carried out successfully at room temperature. During the treatment, the lignite granules absorb substantial quantities of the solution and become soft and swollen and more openly porous, and a dark colored substance is extracted from it and is imparted to the solution. An increase of granule size of approximately 50% may be obtained. After the action has ceased and an equilibrium has been reached the granules of alkali lignite are aged in air, and are then soaked in an excess of a dilute acid solution, preferably at room temperature. During the aeration step the alkali lignite granules absorb an appreciable quantity of oxygen and in the acidification step they absorb considerable quantities of the acid solution. The acid serves to neutralize the alkali which has not been neutralized by or chemically combined with the lignite, and it also enters into reaction with the lignite, causing the evolution of carbon dioxide, and causing the granules to shrink to substantially their original size and become hard again. After the acidification step is completed the excess acid is drained and washed from the granules. The acid solution and the wash water carry a black gummy substance which has been extracted from the lignite. The acid solution also extracts, or converts into soluble salts, calcium and magnesium compounds present in the lignite. The resulting granules are lighter in weight than the original lignite. They possess a high cationic exchange capacity and an ability to remove calcium and magnesium to a residual concentration of less than 5 parts per million expressed as calcium carbonate.

In these respects the material of this invention differs from other carbonaceous cationic exchange materials. It possesses higher exchange capacity, is lighter in weight, and is more resistant to attrition loss than such other materials, this resistance being due to decreased frangibility and greater toughness, which are apparent in the product. It also possesses high resistance to the imparting, or "throwing" of color to water.

2

The method described above may be varied in many of its details. For example, if the lignite granules absorb the alkali solution, they readily than is desired and become gummy, they may advantageously be given a preliminary steaming by subjecting them to steam, preferably under substantial pressure, 70 pounds per square inch having been used satisfactorily. it is preferred to employ the alkali solution of sodium, potassium or ammonia. The hydroxides of sodium, potassium and ammonium hydroxide is not as great as with sodium and bicarbonates of sodium, potassium and ammonia may also be used, and the term alkali when used in the specification and claims is intended to include the hydroxides, carbonates and bicarbonates of ammonia as well as of sodium and potassium. The silicates of sodium and potassium dissociate in water to form the corresponding alkali metal hydroxides. These substances are preferred and where sodium hydroxide is used the concentration should not exceed 30% by weight of caustic soda.

Dilute solutions of inorganic and organic acids may be used which form water soluble salts with the positive radical of the alkali solution. They are present in the fossil carbonaceous raw material with calcium and magnesium salts, with calcium and magnesium being absent, or present in the water soluble salts with the fossil carbonaceous raw materials as to be negligible in the acid solution. or carbohydrate materials, the acid may be used which form the positive radical of the specification to designate the acids, the acids are sulphuric, hydrochloric, hydrobromic acids. additional raw mag-Screens. The screened lignite weighs approximately 42 pounds per cubic foot, of which approximately 35% or 14 pounds is moisture and approximately 28 pounds is dry lignite. The granules are mixed in shallow pans with a water solution containing 7.5% caustic soda, 50 pounds of the solution being used to each cubic foot of lignite, 14% of the weight of the lignite, approximately being present. Thorough mixing is continued until the solution is all absorbed by the dry lignite which takes place in less than an hour.
During this time the granules soften and swell to about one and one half times their original size, and their internal structure becomes more open and porous, and they turn darker in color. During this time the lignite is then exposed to the atmosphere at a temperature preferably between 5° C. and 50° C. for a substantial period, 48 hours having been found to be satisfactory. During this soaking the absorption of an amount equal to approximately 5% of the weight of the dry lignite having been observed. The granules are then soaked in an excess of a sulphuric acid solution containing approximately 5% sulphuric acid, this soaking having been continued for a substantial period, 24 hours having been found to be satisfactory. During operation substantial quantities of oxygen are abstracted from the alkalinity present in the ules and the remainder reacting chemically to neutralize excess alkalinity present in the substance of the lignite.
There is also an evolution of gases during the probably formed during the acidification of the granules. They return in substantially the shrinking and hardening of the granules.
After the acidification, the granules are separated from the alkali solution, and become ules are separated from the solution, and washed with water. They are then found to be suitable for use as a cation exchange material.
tial quantity of original capacity of exchange is the oxidation of the lignite.

to steam at a pressure of 70 pounds per square inch for a period of approximately two hours. The steamed granules are then treated with caustic soda, air and acid in accordance with the method of Example No. 1.

*Example No. 3*

In an alternative method the crushed and screened lignite is given a preliminary treatment with a 5% sulphuric acid solution, preferably by soaking in an excess of such a solution for a period of several hours. The granules are then separated from the solution and washed with water. They are then given an alkali treatment, followed by aeration, in accordance with the method of Example No. 1. The aeration is followed by soaking the granules in an excess of a 5% solution of phosphoric acid for about 24 hours, after which they are separated from the solution and washed and dried.

In this modification of the method, any of the acid-reacting compounds mentioned heretofore which are capable of forming water soluble salts with calcium and magnesium may be used in the first acidification step. This acid solution extracts calcium and magnesium from the granules. In the second acidification step in which the alkali-lignite granules are caused to shrink and harden from their soft and swollen condition, any acid may be used which is capable of forming a soluble salt with the positive radical of the alkali solution.

As a further variation of the method, the aeration of the alkali lignite granules may be accelerated by blowing air under pressure through a bed of them, preferably in an upward direction. In this way the aeration may be accomplished in less time, 24 hours being adequate, and as little as one hour being satisfactory, depending on the conditions of aeration.

The granules or particles of carbonaceous material may be formed in any desired manner, by crushing larger masses of the raw material as described heretofore, or by making pellets by uniting finely divided material by means of an adhesive.

The concentration of the alkali and acid solutions may be varied within the limits set forth heretofore for satisfactory solutions, and the periods of time for the different steps of the treatments are not critical, it being essential only that sufficient time be allowed for the purposes of the different treatments to be accomplished.

The finished material is adapted for use as a cationic exchange material in purifying water in the usual way, and may be regenerated cyclically. For this purpose it is arranged in the form of a bed of the granules. The water to be treated is passed through the bed until the exchange capacity of the granules is exhausted. It may then be backwashed if desired, and then regenerated by percolating through it a water solution containing a small amount of sulphuric acid or of an alkali metal salt such as sodium chloride. After this the bed is washed with water until the salts formed during regeneration and the excess regenerating solution have been rinsed therefrom, after which the water to be treated may be passed through it again. Iron and manganese are among the cations which may be removed from water by the product of this invention and it is adapted for removing iron and manganese from water containing salts of these metals in solution. Where it is used for this purpose regeneration may be carried out cyclically in the same manner as described above, using a solution of an acid or a salt having an acid reaction, such as sodium bi-sulphate.

It is understood that whenever the word "solution" is used in the description and claims, an aqueous solution is contemplated.

I claim:

1. The method of preparing a carbonaceous cationic exchange material which comprises impregnating a granular carbonaceous material from the group consisting of fossil carbonaceous material, and wood, wood pulp and grain hulls which have been subjected to carbonization under conditions whereby they retain appreciable amounts of hydrogen, with an aqueous solution of up to approximately 30% by weight of an alkali until said granules have become softened and swollen, subjecting said treated material to an oxidizing action by means of free oxygen, subjecting said oxidized material to a dilute aqueous solution of an acidic reagent which forms water-soluble reaction products only with said alkali to neutralize the excess alkalinity in said granules, said solution of acidic reagent having an acidity equivalent to that of a concentration of from approximately 0.78% to approximately 10% by weight of sulfuric acid and water washing the excess of said acidic reagent from said granules.

2. The method of preparing a carbonaceous cationic exchange material which comprises impregnating a granular carbonaceous material from the group consisting of fossil carbonaceous material, and wood, wood pulp and grain hulls which have been subjected to carbonization under conditions whereby they retain appreciable amounts of hydrogen, with an aqueous solution of up to approximately 30% by weight of an alkali until said granules have become softened and swollen, exposing said treated granules to an atmosphere containing oxygen until it has absorbed substantial quantities of oxygen, and subjecting said oxidized granules to a dilute aqueous solution of an acid which forms water soluble reaction products only with said alkali to neutralize the excess alkalinity contained by said material, said acid solution having an acidity equivalent to that of a concentration of from approximately 0.78% to approximately 10% by weight of sulfuric acid, and water washing the excess acid from said granules.

3. The method of preparing a carbonaceous cationic exchange material which comprises impregnating a granular carbonaceous material from the group consisting of fossil carbonaceous material, and wood, wood pulp and grain hulls which have been subjected to carbonization under conditions whereby they retain appreciable amounts of hydrogen, with an aqueous solution of up to approximately 30% by weight of a caustic alkali until said granules have become softened and swollen, exposing said treated granules to an atmosphere containing oxygen until they have absorbed substantial quantities of oxygen, and subjecting said oxidized granules to a dilute aqueous solution of an acid which forms water soluble reaction products only with said caustic alkali to neutralize the excess alkalinity present in said granules, said acid solution having an acidity equivalent to that of a concentration of from approximately 0.78% to approximately 10% by weight of sulfuric acid, and water washing the excess acid from said granules.

4. The method of preparing a carbonaceous cationic exchange material which comprises subjecting a granular fossil carbonaceous material to an aqueous solution of up to approximately 30% by weight of an alkali until said material has become charged with a substantial quantity of alkali and has become softened and swollen, exposing said treated material to an atmosphere containing oxygen until said material has absorbed a substantial quantity of oxygen, subjecting said oxidized material to dilute aqueous solution of an acid which forms water soluble reaction products only with said alkali to neutralize excess alkalinity contained by said material, said acid solution having an acidity equivalent to that of a concentration of from approximately 0.78% to approximately 10% by weight of sulfuric acid, and water washing the excess acid from said material.

5. The method of preparing a carbonaceous cationic exchange material which comprises impregnating a granular fossil carbonaceous material with an aqueous alkaline solution of up to approximately 30% by weight of sodium hydroxide until said granules have become softened and swollen, subjecting said treated material to free oxygen until said material has absorbed a substantial quantity of oxygen, subjecting said oxidized material to a dilute aqueous solution of an acid which forms water-soluble reaction products only with said sodium hydroxide to neutralize the excess alkalinity contained by said material, said acid solution having an acidity equivalent to that of a concentration of from approximately 0.78% to 10% by weight of sulfuric acid, and water washing the excess acid from said material.

6. The process of preparing a cationic exchange material which comprises subjecting granular fossil carbonaceous material to steam under substantial pressure, impregnating said material with an aqueous solution of up to approximately 30% by weight of an alkali until said granules have become softened and swollen, subjecting said treated granules to an oxidizing action by means of free oxygen, treating said granules with a dilute aqueous solution of an acid which forms water-soluble reaction products only with said alkali to neutralize the excess alkalinity contained in said granules, said acid solution having an acidity equivalent to that of a concentration of from approximately 0.78% to approximately 10% by weight of sulfuric acid, and water washing the excess acid from said granules.

7. The process of preparing a cationic exchange material which comprises subjecting a granular fossil carbonaceous material successively in the order named, to a dilute aqueous solution of an acid-reacting compound capable of forming water-soluble salts with calcium and magnesium, to a water washing operation to remove excess acid, to an aqueous solution of up to approximately 30% by weight of an alkali until said granules have become softened and swollen, to an oxidizing action by means of free oxygen, to a dilute aqueous solution of an acid which forms water-soluble reaction products only with said alkali to neutralize the excess alkalinity present in said granules, said acid solution having an acidity equivalent to that of a concentration of from approximately 0.78% to approximately 10% by weight of sulfuric acid, and to a water washing operation to remove excess acid from said granules.

8. The method of preparing a carbonaceous cationic exchange material which comprises impregnating granular lignite with an aqueous solution in which the solute consists essentially of an alkali in a concentration up to approximately 30% by weight of said alkali until said granules have become softened and swollen, subjecting said treated lignite to free oxygen until said lignite has absorbed a substantial quantity of oxygen, subjecting said oxidized lignite to a dilute aqueous solution of an acid which forms water-soluble reaction products only with said alkali to neutralize the excess alkalinity present in said treated lignite, said acid solution having an acidity equivalent to that of a concentration of from approximately 0.78% to approximately 10% by weight of sulfuric acid, and water washing the excess acid from said treated lignite.

9. The process of preparing a cationic exchange material which comprises impregnating granular lignite with an aqueous solution of up to approximately 30% by weight of an alkali metal hydroxide until said granules have become softened and swollen, subjecting said treated granules to an oxidizing action by means of free oxygen, subjecting said granules to an aqueous solution of from approximately 0.78% to approximately 10% of sulfuric acid to neutralize the excess alkalinity present in said granules, and washing the excess acid from said granules.

10. The process of preparing a cationic exchange material, which comprises subjecting granular lignite to steam at substantial pressure, subjecting said granules to an aqueous solution of up to approximately 30% by weight of caustic alkali until said granules have become softened and swollen, subjecting said treated granules to an oxidizing action by means of free oxygen, subjecting said oxidized granules to a dilute aqueous solution of an acid which forms water soluble reaction products only with said caustic alkali to neutralize the excess alkalinity present in said granules, said acid solution having an acidity equivalent to that of a concentration of from approximately 0.78% to approximately 10% by weight of sulfuric acid, and washing the excess acid from said granules.

MILTON J. SHOEMAKER.